(No Model.)

W. C. McQUILLEN.
GRASS CATCHING ATTACHMENT FOR LAWN MOWERS.

No. 432,065. Patented July 15, 1890.

Witnesses

Inventor
Walter C. McQuillen
Hazard & Townsend
his Attys.

UNITED STATES PATENT OFFICE.

WALTER C. McQUILLEN, OF LOS ANGELES, CALIFORNIA.

GRASS-CATCHING ATTACHMENT FOR LAWN-MOWERS.

SPECIFICATION forming part of Letters Patent No. 432,065, dated July 15, 1890.

Application filed November 20, 1889. Serial No. 331,010. (No model.)

*To all whom it may concern:*

Be it known that I, WALTER C. MCQUILLEN, a citizen of the United States, residing at Los Angeles, in the county of Los Angeles and State of California, have invented a new and useful Improvement in Grass-Catching Attachments for Lawn-Mowers, of which the following is a specification.

My invention relates to that class of grass-catching attachments for lawn-mowers in which the attachment consists of a receptacle closed at the sides, top, and bottom, and open at the front and provided with means for attachment to the rear of the mower.

The object of my invention is to increase the capacity and efficiency of the receptacle; also to improve the means of connecting the receptacle with the rear of the mower, whereby such means of connection are relieved from excessive strain, and whereby the attachment of the receptacle to the mower and its removal therefrom are greatly facilitated.

A further object is to provide means for nesting the attachments when it is desired to ship them.

The accompanying drawings illustrate my invention.

Figure 1:
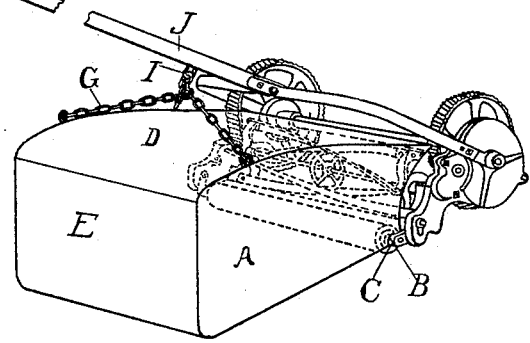
Figure 2:
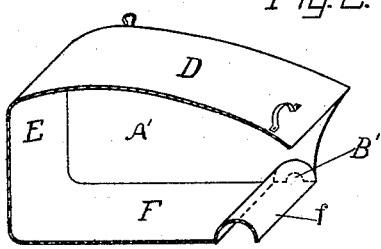
Figure 4:
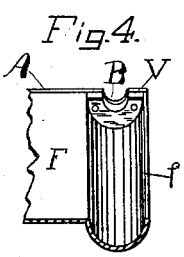
Figure 3:
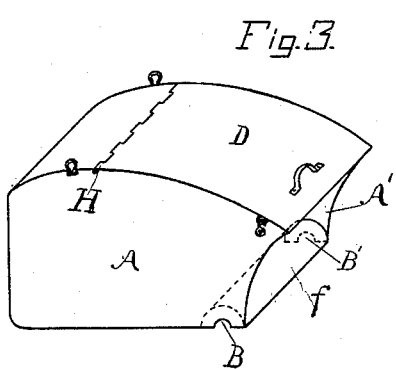

Figure 1 is a perspective view of a lawn-mower provided with my improved attachment adjusted for operation. Fig. 2 is a section of my improvement detached from the mower. Fig. 3 is a perspective view of my improved attachment with the top hinged for convenience in packing and shipping. Fig. 4 is an inverted view of a fragment of the floor of the box, showing the re-enforcing plate V.

The box comprises the two side walls A A', vertically contracted in front and provided at their lower front corners with downwardly-opening semicircular notches B B', adapted to fit upon the roller-brackets C of the mower, the top D, rear wall E, and the floor F provided with the semi-cylindrical arch *f* at the front to receive the rear roller of the mower. The rear end of the box is adjustably attached to and suspended from the handle of the mower by a bail G or other suitable means. In the drawings, G is a chain adapted to catch over hook I fixed to the handle J. The chain is preferably of such length as to accommo- date a tall person, and when the machine is used by shorter persons the chain can be adjusted by catching two links in the hook and allowing the slack chain to dangle. The top, rear wall, and bottom of the box may be made of one continuous strip of sheet metal.

The semicircular notches B B', fitting as journals upon the brackets or trunnions of the roller, allow free vertical oscillation of the receptacle, and although the receptacle is securely attached to the mower it is readily removed therefrom when lifted out of its engagement therewith.

I am aware that heretofore grass-catching receptacles have been hinged at the front end to the rear end of the mower and suspended from the handle at the rear end, and I am aware that it has been suggested to attach the receptacle in front of the mower to bearings of the machinery by clamps, and I am also aware that a box has been mounted upon the top of a lawn-mower projecting in front of and to the rear of the cutter-blades, and that the lower edges of the sides of such box have been irregularly notched at a point between its front and rear ends to fit upon the casing of the cutter-blades. My invention differs from these forms of construction in that I employ a semi-cylindrical arch at the front end of the floor and provide each side with a semicircular notch concentric with such arch to journal upon the trunnions or arbor-brackets of the rear roller. By this means I have been enabled to produce a simple hinged fastening which, while forming a perfect hinged connection, preventing the escape of the cut grass, can be instantly removed or adjusted over the rear roller of the mower, allowing the notches B B' to fit upon the roller-brackets C, or upon the trunnions of the rollers, as the case may be, in different machines. (The re-enforcing-plate V is designed to prevent destruction of the notched side walls by reason of their engagement with such brackets or trunnions.) The rear end of the box is then secured to the handle by chain G, and the mower is advanced to cut the grass. The revolving cutter throws the grass back into the box. The top of the box which projects over such cutters prevents the grass from being thrown out of the box. The arch *f* prevents the grass from slipping forward along the bottom of the box and thus out at front. The bail G, employed to secure the rear end of the box to the handle of the mower, is adjusted to such length that the box will be suspended about an inch (more or less) above the ground when the handle J is in convenient position for operation. The bottom of the box is rounded at the rear, so that it will not be liable to catch upon obstructions when the machine is dragged backward. The notches B and the roller-brackets (or trunnions, as the case may be) form a hinge between the front part of the box and the rear of the mower, which allows the vertical play to the rear end of the box, so it can be lifted to pass it over obstructions. When the box is filled it is removed and the grass is emptied out at the open front end.

Now, having described my invention, what I claim as new, and desire to secure by Letters Patent, is—

The grass-catching receptacle, comprising the rear wall, the top, the horizontal floor provided with the semi-cylindrical arch at the front to receive the rear roller of the mower, and the side walls each provided with a semi-circular notch concentric with such arch to journal upon the trunnions of the roller.

WALTER C. McQUILLEN.

Witnesses:
JAMES R. TOWNSEND,
W. C. FURREY.